US009810783B2

(12) United States Patent
Fligler et al.

(10) Patent No.: US 9,810,783 B2
(45) Date of Patent: Nov. 7, 2017

(54) VEHICLE DETECTION (71) Applicant: Empire Technology Development LLC, Wilmington, DE (US)

(72) Inventors: Ariel Fligler, Hod-Hasharon (IL); David Hirshberg, Haifa (IL); Shay Bushinsky, Ganei Tikva (IL); Shmuel Ur, Galil (IL); Vlad Dabija, Mountain View, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 124 days.

(21) Appl. No.: 14/278,802

(22) Filed: May 15, 2014

(65) Prior Publication Data
US 2015/0332591 A1 Nov. 19, 2015

(51) Int. Cl.
| | |
|---|---|
| *B60Q 1/00* | (2006.01) |
| *G08B 1/08* | (2006.01) |
| *G08B 23/00* | (2006.01) |
| *G08G 1/00* | (2006.01) |
| *G08G 1/16* | (2006.01) |
| *H04B 10/00* | (2013.01) |
| *G08G 1/09* | (2006.01) |
| *G06F 15/16* | (2006.01) |
| *G01S 15/04* | (2006.01) |
| *G08G 1/017* | (2006.01) |
| *G08G 1/054* | (2006.01) |

(52) U.S. Cl.
CPC ............ *G01S 15/04* (2013.01); *G08G 1/0175* (2013.01); *G08G 1/054* (2013.01)

(58) Field of Classification Search
CPC ........ G08B 13/19645; G08B 13/19663; G08B 13/19608; G08B 13/19613; G08B 13/19647; G08B 13/19652; G08B 25/016; H04N 7/188; H04N 1/00323
See application file for complete search history.

(56) References Cited

U.S. PATENT DOCUMENTS

| | | | | |
|---|---|---|---|---|
| 6,154,149 A | * | 11/2000 | Tyckowski | B60Q 9/008 318/480 |
| 7,015,792 B2 | * | 3/2006 | Lessard | B60R 25/04 340/426.11 |
| 7,202,776 B2 | * | 4/2007 | Breed | B60N 2/2863 340/435 |

(Continued)

OTHER PUBLICATIONS

Barber, P. and Cooper, S., "Visibility Poster panel visibility for drivers and passengers: a first look," pp. 1-32 Route Research Limited (2013).

(Continued)

*Primary Examiner* — Steven Lim
*Assistant Examiner* — Muhammad Adnan
(74) *Attorney, Agent, or Firm* — Brundidge & Stanger, P.C.

(57) ABSTRACT

In some examples, vehicle detection includes detecting a target vehicle that has at least one designated attribute, confirming that the detected target vehicle is within an unobstructed or partially obstructed line of sight of the first object, and confirming that the target vehicle has been detected within the unobstructed or partially obstructed line of sight of the first object.

14 Claims, 4 Drawing Sheets

(56) References Cited

U.S. PATENT DOCUMENTS

| | | | | |
|---|---|---|---|---|
| 7,671,762 B2 * | 3/2010 | Breslau | ................ | G08G 1/205 340/10.42 |
| 7,844,183 B2 * | 11/2010 | Isoz | ................ | F41A 33/02 398/122 |
| 8,294,595 B1 * | 10/2012 | Plotke et al. | ................ | 340/937 |
| 8,345,098 B2 * | 1/2013 | Grigsby | ................ | G06K 9/00791 348/143 |
| 8,451,141 B2 * | 5/2013 | Uechi | ................ | G08G 1/096783 340/435 |
| 8,558,718 B2 * | 10/2013 | Mochizuki | ................ | G08G 1/161 340/436 |
| 8,620,023 B1 * | 12/2013 | Plotke | ................ | 382/103 |
| 8,798,841 B1 * | 8/2014 | Nickolaou | ................ | B60K 31/0008 340/435 |
| 8,818,682 B1 * | 8/2014 | Dolgov | ................ | G05D 1/0055 180/167 |
| 2002/0113872 A1 * | 8/2002 | Kinjo | ................ | 348/116 |
| 2004/0160327 A1 * | 8/2004 | Kusano | ................ | 340/576 |
| 2004/0199785 A1 * | 10/2004 | Pederson | ................ | 713/200 |
| 2006/0007308 A1 * | 1/2006 | Ide et al. | ................ | 348/143 |
| 2006/0055521 A1 * | 3/2006 | Blanco et al. | ................ | 340/441 |
| 2006/0250272 A1 * | 11/2006 | Puamau | ................ | G08C 17/02 340/12.22 |
| 2009/0248222 A1 * | 10/2009 | McGarry | ................ | G08G 1/052 701/2 |
| 2011/0045842 A1 * | 2/2011 | Rork | ................ | H04L 51/20 455/456.1 |
| 2011/0175755 A1 * | 7/2011 | Yoshioka | ................ | G01S 3/8083 340/995.1 |
| 2012/0170412 A1 * | 7/2012 | Calhoun et al. | ................ | 367/118 |
| 2012/0269386 A1 * | 10/2012 | Hankins | ................ | H04N 7/185 382/103 |
| 2012/0271484 A1 * | 10/2012 | Feit et al. | ................ | 701/1 |
| 2013/0046572 A1 * | 2/2013 | Hsu | ................ | 705/7.15 |
| 2013/0162448 A1 * | 6/2013 | Mochizuki | ................ | G08G 1/096775 340/905 |
| 2013/0279695 A1 * | 10/2013 | Rubin | ................ | G08G 9/02 380/255 |
| 2013/0301406 A1 * | 11/2013 | Sakata | ................ | G08G 1/092 370/229 |
| 2014/0009307 A1 * | 1/2014 | Bowers et al. | ................ | 340/901 |
| 2014/0052293 A1 * | 2/2014 | Bruemmer | ................ | G05D 1/0088 700/248 |
| 2014/0201213 A1 * | 7/2014 | Jackson | ................ | G08G 1/0175 707/741 |
| 2014/0201266 A1 * | 7/2014 | Jackson | ................ | G08G 1/0175 709/203 |
| 2014/0350836 A1 * | 11/2014 | Stettner | ................ | G01S 17/023 701/301 |
| 2015/0220991 A1 * | 8/2015 | Butts | ................ | G06Q 30/0265 705/14.62 |
| 2015/0310742 A1 * | 10/2015 | Albornoz | ................ | G08G 1/096716 340/905 |

OTHER PUBLICATIONS

"Punch buggy," accessed at http://web.archive.org/web/20140408012809/http://en.wikipedia.org/wiki/Punch_buggy, accessed on last modified on Mar. 30, 2014, pp. 1-4.

"Rules of Punch Buggy Uno," accessed at http://web.archive.org/web/20140327122201/http://www.punchbuggyuno.com/, accessed on May 8, 2014, pp. 1-2.

* cited by examiner

VEHICLE DETECTION

TECHNICAL FIELD

The embodiments described herein pertain generally but not exclusively to vehicle detection schemes that may be utilized in various contexts including, but not limited to, social networking, gaming, advertising, law enforcement, and even assisted driving.

BACKGROUND

Unless otherwise indicated herein, the approaches described in this section are not prior art to the claims in this application and are not admitted to be prior art by inclusion in this section.

The automobile is becoming a hub of social interaction due, in large part, to advancements in technology and advancements in creativity. Built-in and hand-held consoles, e.g., smart phones, provide vehicle passengers and even vehicle drivers with instant access to media content.

SUMMARY

In one example embodiment, a non-transitory computer-readable medium that stores executable instructions, in response to execution by one or more processors, may cause the one or more processors to perform or control operations including searching for at least one target object, detecting at least one target object in an unobstructed line of sight, and confirming that the at least one target object was detected in an unobstructed line of sight.

In another example embodiment, a method to implement vehicle detection includes detecting a target vehicle that has at least one designated attribute, confirming that the detected target vehicle is within an unobstructed or partially obstructed line of sight of the first object, and confirming that the target vehicle has been detected within the unobstructed or partially obstructed line of sight of the first object.

In yet another example embodiment, a vehicle detection system includes a detector that is configured to search for at least one vehicle that matches a particular criterion and indicate when the at least one vehicle that matches the particular criterion has been detected in an unobstructed line of sight in relation to a host of the vehicle detection system. The system also includes a confirmation module configured to confirm that the at least one vehicle that matches the particular criterion has been detected in an obstructed line of sight in relation to the host of the vehicle detection system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications are possible from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. The aspects of the present disclosure, as generally described herein and illustrated in the drawings, may be arranged, substituted, combined, separated, and designed in a wide variety of different configurations, all of which are explicitly contemplated herein.

This disclosure is generally drawn, inter alia, to methods, apparatus, systems, devices, and computer program products related to vehicle detection schemes that may be utilized in various contexts including, but not limited to, social networking, gaming, advertising, law enforcement, and even assisted driving.

Briefly stated, in some examples, vehicle detection includes detecting a target vehicle that has at least one designated attribute, confirming that the detected target vehicle is within an unobstructed or partially obstructed line of sight of the first object, and confirming that the target vehicle has been detected within the unobstructed or partially obstructed line of sight of the first object.

Figure 1:
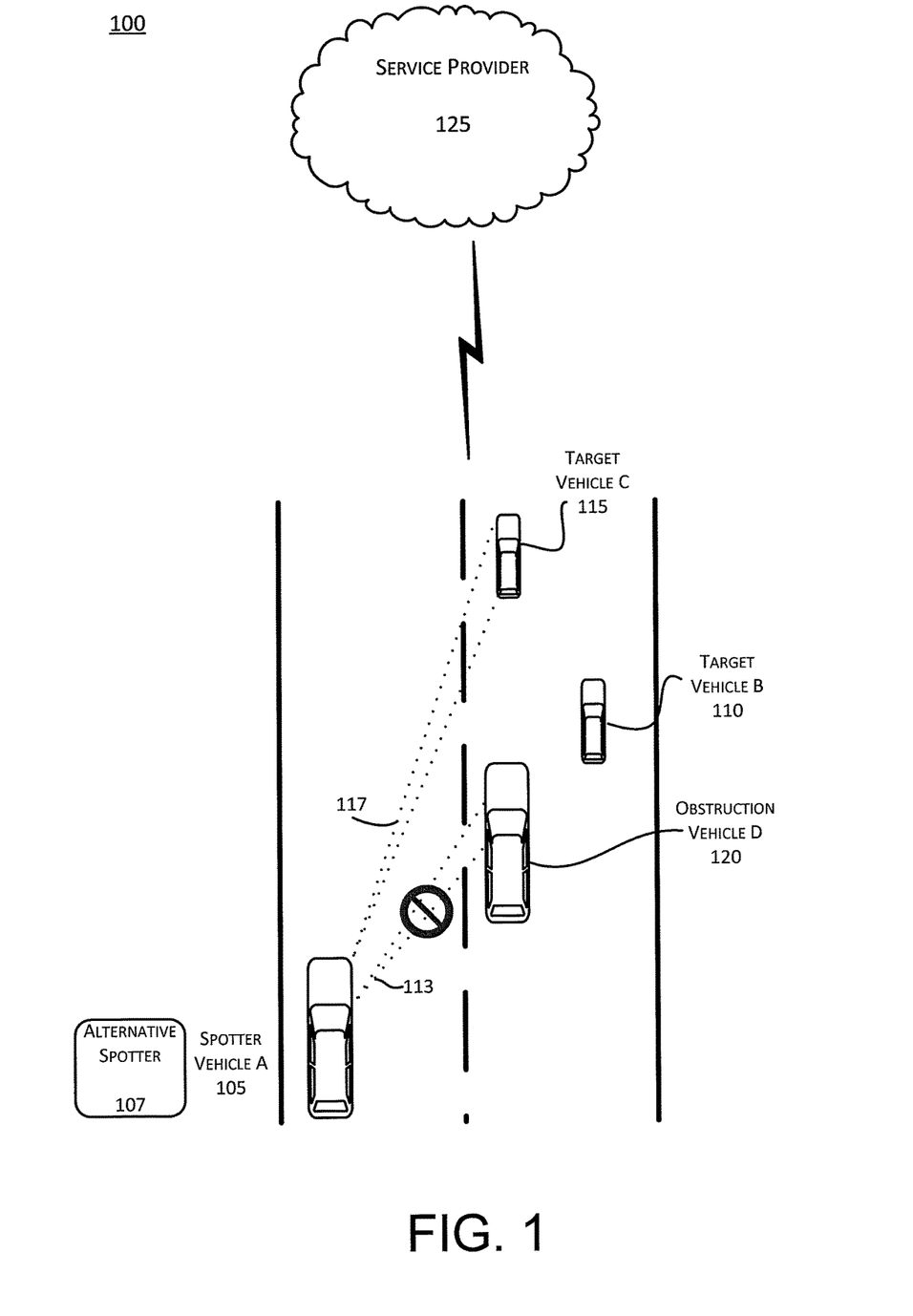
FIG. 1 shows an example configuration of an environment in which vehicle detection may be implemented in accordance with at least some embodiments described herein.

FIG. 1 shows an example configuration of an environment in which vehicle detection may be implemented in accordance with at least some embodiments described herein. FIG. 1 shows spotter vehicle A 105, target vehicle B 110, target vehicle C 115, obstruction vehicle D 120, and service provider 125. One or more of spotter vehicle A 105, target vehicle B 110, target vehicle C 115, and obstruction vehicle D 120 may be communicatively coupled to a server of service provider 125.

Spotter vehicle A 105 may refer to a vehicle from which verified detection of a target object through an unobstructed line of sight is sought. In the example embodiments described herein, spotter vehicle A 105 may include an automobile, e.g., car, truck, van, etc., or any other motorized transporter, e.g., motorcycle, scooter, trailer, etc.

In some example embodiments, spotter vehicle A 105 may host a detector device that may be configured, designed, or programmed to search for and detect target objects. Non-limiting examples of the detector device may include a camera that captures still and/or video images; radar detectors; sonar devices; motion detecting lasers; other types of surveillance systems associated with the spotter vehicle and configured to have 360° detection capabilities, etc.

Spotter vehicle A 105 may further host a client device that is configured, designed, and/or programmed to interface with the detector device, determine whether detection of a target object is in compliance with one or more conditions, and serve as a communications interface. The client device may be provided as a device that is built-in to spotter vehicle A 105 or may be provided as a separate, hand-held client device that is at least controlled by an occupant, e.g., driver and/or passenger, of spotter vehicle A 105. The client device may also be a portable device that is mountable or otherwise attachable to spotter vehicle A 105. The client device, whether built-in or hand-held or portably mounted, may be provided in the form of, e.g., a smart-phone, tablet computer, laptop computer, electronic appliance, etc., that is configured to execute an instance of a vehicle detection application. Regardless of the physical configuration of the client device, the client device may be configured to communicate with service provider 125 and an occupant and/or client device corresponding to either of target vehicle B 110 and target vehicle C 115.

Alternative spotter 107, in addition to or as an alternative to spotter vehicle A 105, may refer to a stationary kiosk-like station from which detection of a target object through an unobstructed line of sight may be sought. Similar to spotter vehicle A 105, alternative spotter 107 may host a detector device that may be configured, designed, or programmed to search for and detect target objects. Non-limiting examples of the detector device may include a camera that captures still and/or video images, radar detectors, sonar devices, motion detecting lasers, etc. Alternative spotter 107 may also host a client device that is configured, designed, and/or programmed to interface with the detector device, determine whether detection of a target object is in compliance with one or more conditions, and serve as a communications interface.

Target vehicle B 110 and target vehicle C 115 may refer to respective vehicles that may be subjected to a search by an owner, operator, and/or occupant of spotter vehicle A 105. Target vehicle B 110 and target vehicle C 115 may or may not be configured in the same manner as spotter vehicle A 105. That is, target vehicle B 110 and target vehicle C 115 may or may not be provided with a detector device or a client device as is spotter vehicle A 105, as described above. However, target vehicle B 110 and target vehicle C 115 may be provided with a communication device, e.g., a smart-phone, tablet computer, laptop computer, etc., by which detection by spotter vehicle A 105 may be confirmed to spotter vehicle A 105 and/or service provider 125.

Line of sight 113 may refer to a line of sight by which target vehicle B 110 may be searched for and/or detected by a detector provided to spotter vehicle A 105. As depicted in FIG. 1, and in accordance with some example embodiments, line of sight 113 from spotter vehicle A 105 to target vehicle B 110 may be obstructed by obstruction vehicle D 120.

Line of sight 117 may refer to a line of sight by which target vehicle C 115 may be searched for and/or detected by a detector provided to spotter vehicle A 105. As depicted in FIG. 1, and in accordance with some example embodiments, line of sight 117 from spotter vehicle A 105 to target vehicle C 115 may be unobstructed.

As referenced herein, an obstruction may refer to any object that may at least partially obscure a view of the target object from the vantage point of spotter vehicle A 105 or, alternatively or additionally, alternative spotter 107. In some example embodiments, an object may be deemed an obstruction if the object prevents a completely clear view or presents even a nominal obstruction to the transmittal of communication signals from spotter vehicle A 105, or alternative spotter 107, to a detected target object. Non-limiting examples of such obstructions may include other vehicles, billboards, buildings, people, trees, topological features, e.g., hills, curves, etc. Other examples of obstructions may include weather elements, e.g., fog, heavy rain, smoke/smog, snow, etc. Some embodiments of vehicle detection may allow for partial obstructions to exist in the line of sight between spotter vehicle A 105 and a detected target object. The magnitude of such allowable obstruction, in such instances, may vary from one embodiment to another.

Service provider 125 may refer to a service provider to which a client device corresponding to at least spotter vehicle 105 and/or alternative spotter 107 may be registered. Non-limiting examples of service provider 125 may include: internet service providers (ISPs) that host mapping applications, e.g., Microsoft®, Google®, Yahoo®; telecommunications service providers that provide wireless communications services, e.g., Verizon®, T-Mobile®, AT&T®; smartphone manufacturers through which applications may be disseminated to users, e.g., Apple®, Samsung®, Blackberry®; GPS device manufacturers, e.g., Garmin®, Magellan®, TomTom®; law-enforcement or municipal entities; or third-party entities that may provide driver assistance or navigational services to a driver or vehicle operator, e.g., vehicle manufacturers, OnStar®, etc.

Service provider 125 may serve as a communications platform through which instructions for vehicle detection may be transmitted to spotter vehicle A 105 and/or alternative spotter 107. Further, service provider 125 may serve as a communication platform through which a payoff of a confirmed detection of target vehicle B 110 and/or target vehicle C 115 may be facilitated.

As referenced herein, payoff may refer to an acknowledgement, reward, or further communication directed to at least one of spotter vehicle A 105 and a detected one of target vehicle B 110 and target vehicle C 115. Non-limiting examples of a payoff may include a direct acknowledgement, social media acknowledgement, service provider reward points, advertisements, law enforcement communication, driving assistance, etc.

Figure 2:
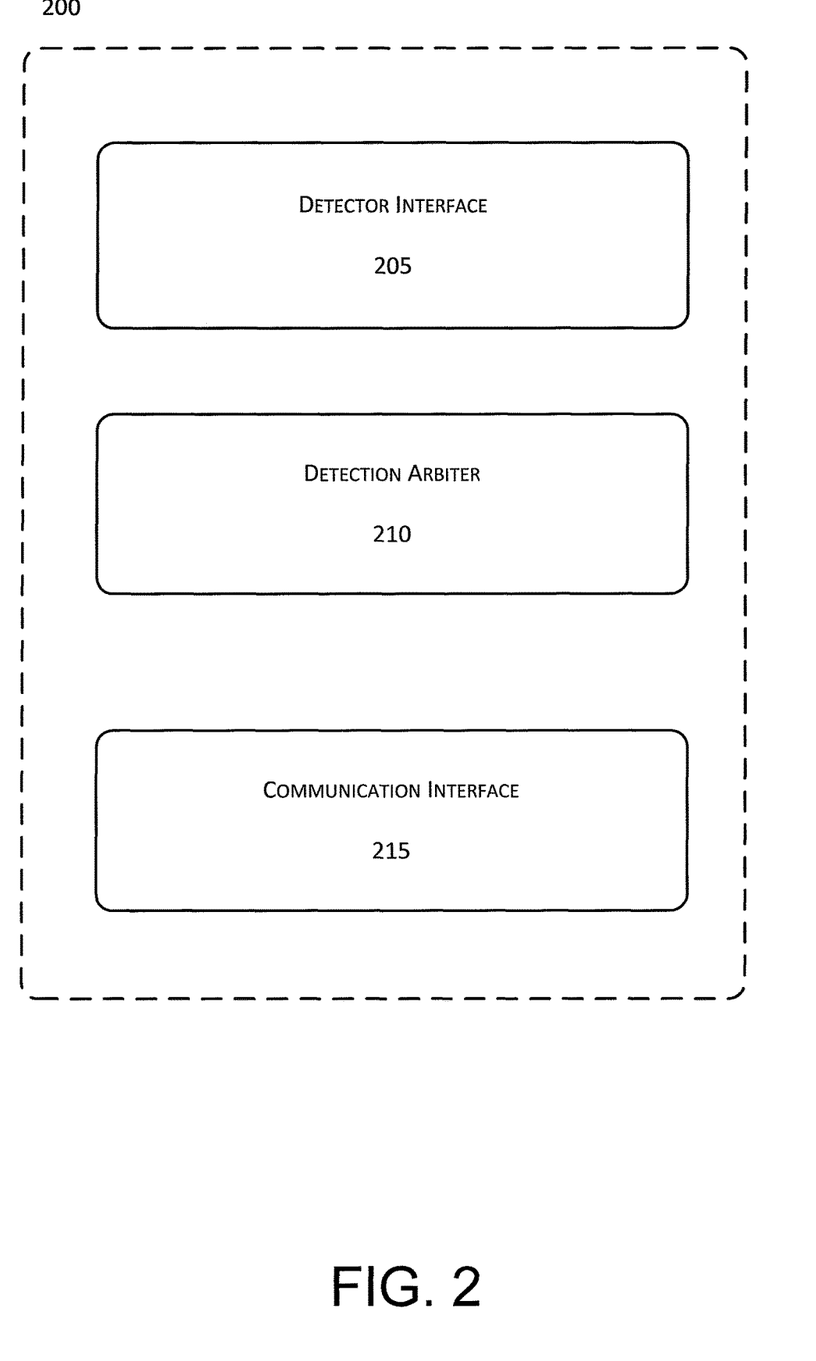
FIG. 2 shows an example configuration of a device, arranged in accordance with at least some embodiments described herein, by which vehicle detection may be implemented.

FIG. 2 shows an example configuration of a device 200, arranged in accordance with at least some embodiments described herein, by which vehicle detection may be implemented. Device 200 may be embodied by a console that is built-in to a vehicle or a client device that is held by a driver or passenger in a vehicle or as a mounted and removable (portable) electronic device. In the example embodiments described herein, device 200 may be provided to, at least, spotter vehicle A 105 and/or alternative spotter 107. As depicted, device 200 may include, at least, detector interface 205, detection arbiter 210, and communication interface 215 operatively coupled to each other. Detector interface 205, detection arbiter 210, and communication interface 215 may, respectively, be implemented as a hardware device, as software, as firmware, or any combination thereof.

Detector interface 205 may refer to a component or module that is configured, designed, and/or programmed to provide instructions to a detector device that may be configured, designed, or programmed to search for and detect target objects.

The instructions to search for one or more target objects, e.g., vehicles, may include a description or attribute of the one or more target objects. The instructions may include, for example, at least one attribute of a target vehicle, including a particular make, model, and/or color. Such target vehicles may be more easily searched for and/or detected when the detector device is embodied by a camera that captures still and/or video images. As another example, the instructions may include another attribute of a target vehicle that includes any vehicle within a predetermined distance of spotter vehicle A 105 or alternative spotter 107. Such target vehicles may be more easily searched for and/or detected when the detector device is embodied by a sonar device. As yet another example, the instructions may include another attribute of a target vehicle that includes any vehicle that is travelling at or beyond a threshold rate of speed within a predetermined distance of spotter vehicle A 105 or alternative spotter 107. Such target vehicles may be more easily searched for and/or detected when the detector device is embodied by a radar device.

Regardless of the physical configuration of the detector device, detector interface 205 may be further configured, designed, and/or programmed to receive a notification from the detector device that a target object has been detected. Accordingly, detector interface 205 may receive digital images, sonar readings, radar readings, laser motion detection readings, etc., from the detector device provided to spotter vehicle A 105 or alternative spotter 107.

Detection arbiter 210 may refer to a component or module that is configured, designed, and/or programmed to determine whether there exists an unobstructed line of sight between spotter vehicle A 105 and the target object, detected by the detector device. Some embodiments of vehicle detection may allow for partial obstructions to exist in the line of sight between spotter vehicle A 105 and a detected target object. The magnitude of such allowable obstruction, in such instances, may be a variable quantity. Detection arbiter 210 may, therefore, be configured, designed, and/or programmed to quantify a magnitude of such an obstruction and make the determination whether such obstruction is permissible in the context of the respective example embodiment.

As described above, the detector device may detect one or more target objects and transmit, to detector interface 205, digital images, sonar readings, radar readings, laser motion detection readings, etc. Detection arbiter 210 may therefore be configured, designed, and/or programmed to visually or digitally detect obstructions between spotter vehicle A 105 and the target object. For example, in the environment 100 depicted in FIG. 1, detection arbiter 210 may visually or digitally detect obstruction vehicle D 120 between spotter vehicle A 105 and target vehicle B 110 in line of sight 113; in addition, or alternatively, detection arbiter 210 may visually or digitally detect that line of sight 117 is unobstructed between spotter vehicle A 105 and target vehicle C 115.

Communication interface 215 may refer to a component or module that is configured, designed, and/or programmed to receive, from a user or service provider 125, instructions to search for and detect target objects. The instructions to search for one or more target objects, e.g., vehicles, may include a description or attribute of the one or more target objects. The received instructions may be input to device 200 by the user via a user interface (UI) or may be received from service provider 125. The received instructions may include at least one attribute of a target vehicle, including a particular make, model, and/or color. In addition, or in the alternative, the instructions may include another attribute of a target vehicle that includes any vehicle within a predetermined distance of spotter vehicle A 105 or alternative spotter 107. In addition, or in the alternative, the instructions may include another attribute of a target vehicle that includes any vehicle that is travelling at or beyond a threshold rate of speed within a predetermined distance of spotter vehicle A 105 or alternative spotter 107. The foregoing examples of the received instructions are just some examples of various implementations that are possible.

Communication interface 215 may be further configured, designed, and/or programmed to communicate with a detected target object. For example, when a target object has been detected, communication interface 215 may transmit a message to the detected target object confirming the detection. In addition, or in the alternative, when a target object has been detected, communication interface 215 may receive a confirmation message from the detected target object that has been detected. Such message may be received from the detected target object with or without prompting from communication interface 215.

As described above, communication interface 215 may be configured, designed, and/or programmed to facilitate communications with service provider 125. Thus, when a target object has been detected, communication interface 215 may transmit a message to service provider 125 to report the detection of the target object. Accordingly, communication interface 215 may further facilitate the payoff of the confirmed detection. As described above, the payoff may refer to an acknowledgement, reward, or further communication directed to at least one of spotter vehicle A 105 and a detected target object.

Communication interface 215 may, therefore, be configured to facilitate communications using one or more of various communication protocols including, but not limited to, GSM (Global System for Mobile communications), IMT (International Mobile Telecommunication)-2000, CDMA (Code Division Multiple Access)-2000, W-CDMA (W-Code Division Multiple Access), Wibro (Wireless Broadband Internet), etc.

Figure 3:
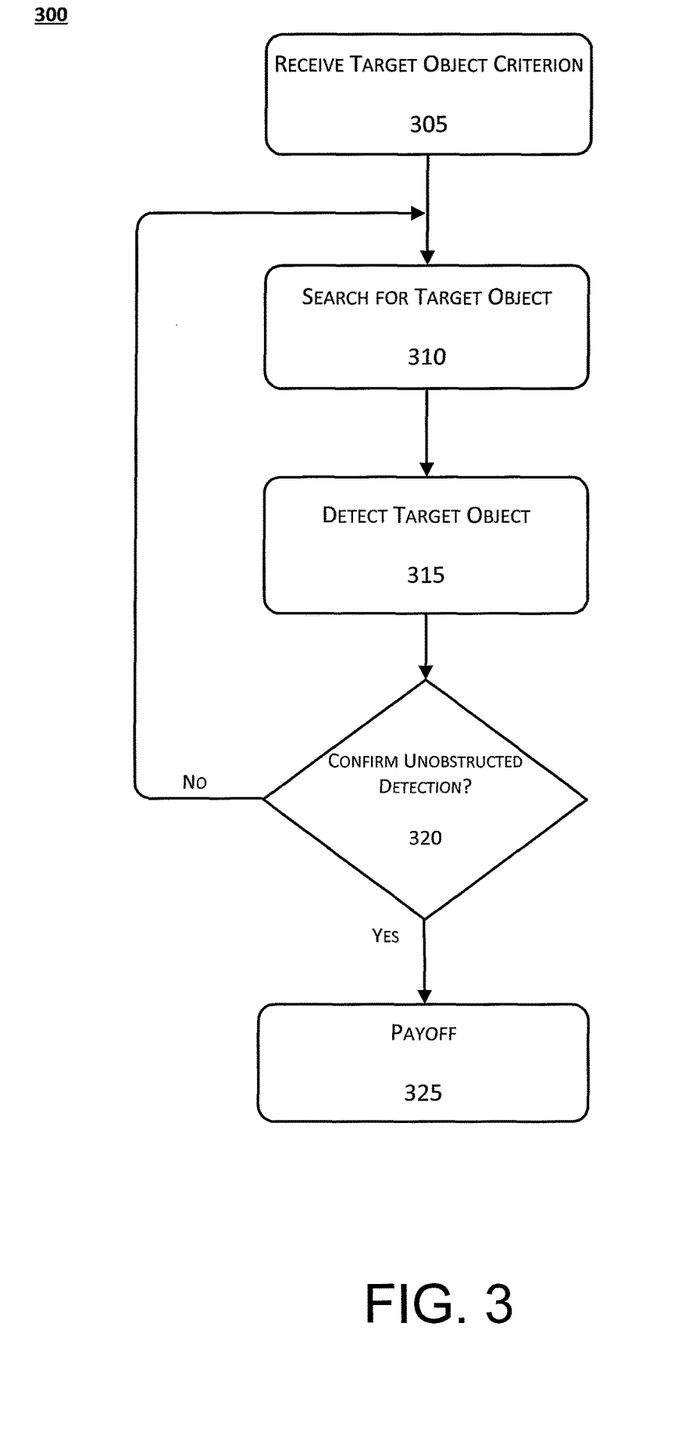
FIG. 3 shows an example process flow by which at least some variations of vehicle detection may be implemented, arranged in accordance with at least some embodiments described herein.

FIG. 3 shows an example process flow by which at least some variations of vehicle detection may be implemented, arranged in accordance with at least some embodiments described herein. Processing flow 300 may include one or more operations, actions, or functions depicted by one or more blocks 305, 310, 315, 320, and 325. Although illustrated as discrete blocks, various blocks may be divided into additional blocks, combined into fewer blocks, supplemented with further blocks, or eliminated, depending on the particular implementation. As a non-limiting example, the description of processing flow 300 may be described in the context of environment 100 described with regard to FIG. 1 and to device 200 described with regard to FIG. 2. Processing may begin at block 305.

Block 305 (Receive Target Object Criterion) may refer to communication interface 215 receiving, from a user or service provider 125, instructions to search for and detect target objects, based on one or more criterion. The instructions to search for one or more target objects, e.g., vehicles, may include a description or attribute of the one or more target objects. The received instructions may include at least one attribute of a target object, including a particular make, model, and/or color of a target vehicle, for example. Further, or alternatively, the instructions may include another attribute of a target object that includes any vehicle within a predetermined distance of spotter vehicle A 105 or alternative spotter 107. Further still, or alternatively, the instructions may include another attribute of a target object that includes any vehicle that is travelling at or beyond a threshold rate of speed within a predetermined distance of spotter vehicle A 105 or alternative spotter 107; and/or a general direction of the target object, which may be submitted or provided by a user verbally or as a manual user input. Again, the foregoing examples of the received instructions and criteria are not to be construed as being inclusive. Block 305 may be followed by block 310.

Block 310 (Search for Target object) may refer to the detector device searching for a target object, in accordance with the instructions and criteria received at block 305. As described earlier, non-limiting examples of the detector device may include a camera that captures still and/or video images, radar detectors, sonar devices, motion detecting lasers, etc. Thus, if the received instructions and criteria include a particular make, model, and/or color of a target vehicle, the search may be more appropriate for the detector device being embodied by a camera that captures still and/or video images. In addition or in the alternative, if the received instructions and criteria specify any vehicle within a predetermined distance of spotter vehicle A 105 or alternative spotter 107, the search may be more appropriate for the detector device being embodied by a sonar device. Also in addition or in the alternative, if the received instructions and criteria specify any vehicle that is travelling at or beyond a threshold rate of speed within a predetermined distance of spotter vehicle A 105 or alternative spotter 107, the search may be more appropriate for the detector device being embodied by a radar device. The foregoing examples of the instructions and criteria, relative to an embodiment of the detector device, are not to be construed as being inclusive. Block 310 may be followed by block 315.

Block 315 (Detect Target object) may refer to detection arbiter 210 and/or communication interface 215 communicatively receiving an indication, from the detector device, that a target object has likely been detected, in accordance with the received instructions and criteria. Based on the physical embodiment of the detection device, the received indication that the target object has likely been detected may include a still image, a video file, a sonar reading, a radar reading, a laser motion detection reading, etc. Block 315 may be followed by decision block 320.

Decision block 320 (Confirm Unobstructed Detection) may refer to detection arbiter 210 determining whether or not there exists an unobstructed line of sight between spotter vehicle A 105 and the detected target object. Detection arbiter 210 may visually or digitally detect obstructions between spotter vehicle A 105 and the target object, detected by the detector device. For example, in the environment 100 depicted in FIG. 1, detection arbiter 210 may visually or digitally detect obstruction vehicle D 120 between spotter vehicle A 105 and target vehicle B 110 in line of sight 113; in addition, or alternatively, detection arbiter 210 may visually or digitally detect that line of sight 117 is unobstructed between spotter vehicle A 105 and target vehicle C 115.

As described above, some embodiments of vehicle detection may allow for partial obstructions to exist in the line of sight between spotter vehicle A 105 and a detected target object. The magnitude of such allowable obstructions, in such instances, may be a variable quantity. For example, an allowable amount of obstruction may lie in the range of 0% obstruction, meaning the line of sight to the target object is clear, to approximately 35%, meaning the target object is substantially visible. Thus, decision block 320 may further or alternatively refer to detection arbiter 210 determining whether a detected obstruction is permissible in the context of the respective example embodiment.

Decision block 320, in addition or in the alternative, may refer to communication interface 215 transmitting a message to the detected target object to confirm the detection. In addition, or in the alternative, when a target object has been detected, communication interface 215 may receive a confirmation message from the detected target object that has been detected.

A positive determination, e.g., yes, at decision block 320 may be followed by block 325; a negative determination, e.g., no, at decision block 320 may be followed by a reversion to block 310.

Block 325 (Payoff) may refer to communication interface 215 transmitting a message to service provider 125 to report the detection of the target object. Upon receiving such report, communication interface 215 may further facilitate the payoff of the confirmed detection. As described above, the payoff may refer to an acknowledgement, reward, or further communication directed to at least one of spotter vehicle A 105 and a detected target object. For example, payoff may refer to an acknowledgement, reward, or further communication directed to at least one of spotter vehicle A 105 and a detected one of target vehicle B 110 and target vehicle C 115. Non-limiting examples of a payoff may include social media acknowledgement, service provider reward points, advertisements, law enforcement communication, driving assistance, etc.

Accordingly, processing flow 300 may facilitate vehicle detection for various contexts including, but not limited to, social networking, gaming, advertising, law enforcement, and even assisted driving as well as others.

Figure 4:
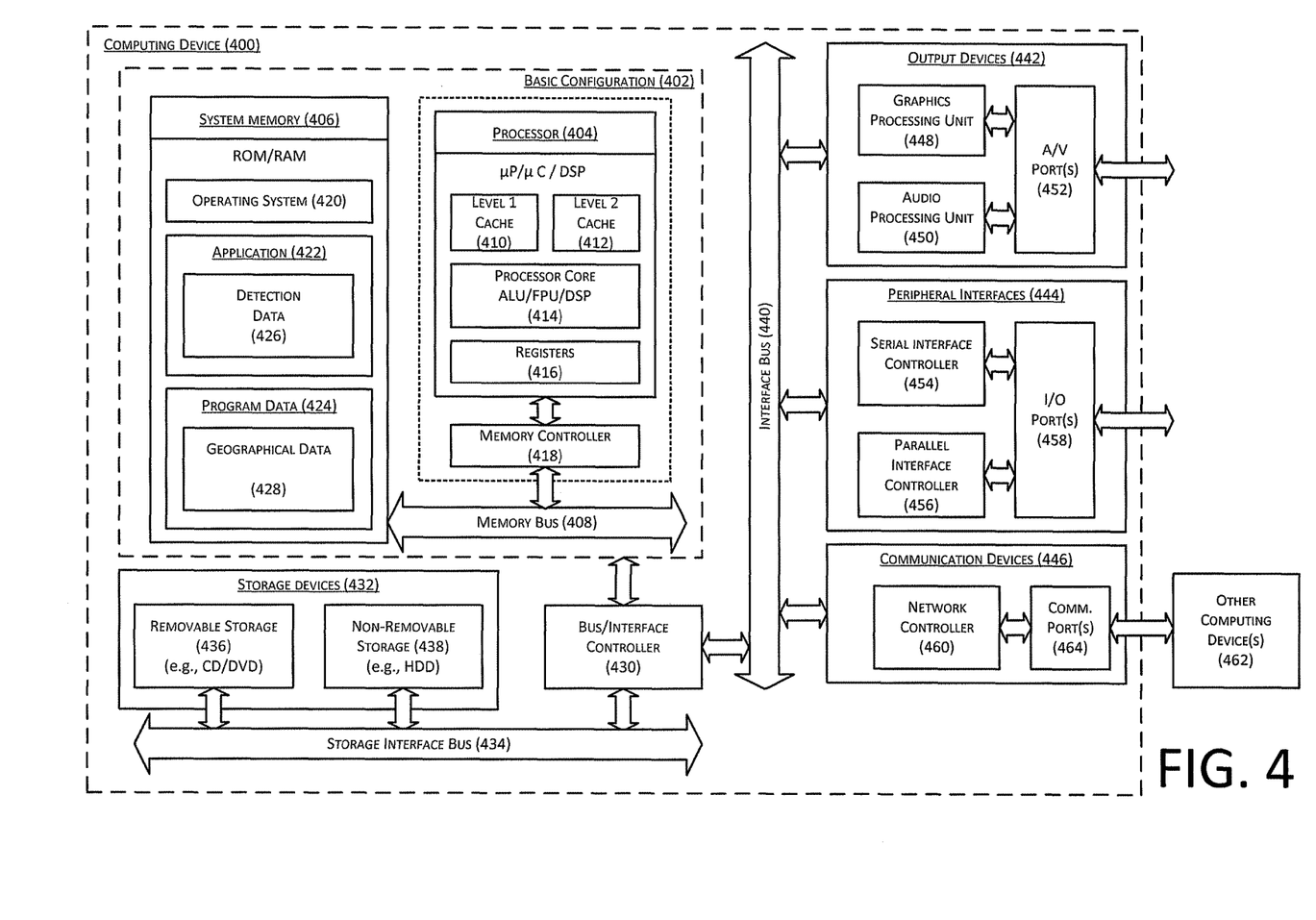
FIG. 4 shows a block diagram illustrating an example computing device by which various example solutions described herein may be implemented, arranged in accordance with at least some embodiments described herein.

FIG. 4 shows a block diagram illustrating an example computing device by which various example solutions described herein may be implemented, arranged in accordance with at least some embodiments described herein. A computing device 400 of FIG. 4 may be used to implement vehicle detection, and may be embodied by a console that is built-in to a vehicle or a client device that is held by a driver or passenger in a vehicle or as a mounted and removable (portable) electronic device.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include detection data 426 that may be used to perform the functions and operations for detection vehicles and determining whether an existing obstruction is acceptable, as described herein including those described with respect to process flow 300 of FIG. 3. Program data 424 may include geographical data 428 that may be utilized for the vehicle detection performed by the application 422 as described herein. Geographical data 428 may include topographical data and meteorological data. In some embodiments, application 422 may be arranged to operate with program data 424 on operating system 420 such that refined precise vehicle detection may be provided, as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 544 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a server or a personal computer including both laptop computer and non-laptop computer configurations.

The use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing location and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances, where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

We claim:

1. A non-transitory computer-readable medium, hosted on a client device removably located in a spotter vehicle or hosted on a built-in device in the spotter vehicle, that stores executable instructions that, in response to execution by one or more processors, cause the one or more processors to perform or control performance of operations comprising:

searching for at least one target object from the spotter vehicle, the spotter vehicle being a vehicle from which verified detection of the at least one target object is sought, the searching comprising operating a radar detector within a 360° range of the spotter vehicle and a laser mounted on or located in the spotter vehicle;

operating in cooperation with an alternative spotter that searches for the at least one target object;

quantifying a magnitude of an obstruction, wherein the magnitude of the obstruction approaches 0% if a line of sight is clear between the at least one target object and both of the alternative spotter and the spotter vehicle;

determining whether the quantified magnitude of the obstruction is permissible to detect the at least one target object, wherein the magnitude of the obstruction is permissible if below a threshold magnitude of obstruction;

based, at least in part, on the quantified magnitude of the obstruction being below the threshold magnitude of obstruction, detecting the at least one target object within a particular distance of the spotter vehicle which is moving at least at a threshold rate of speed greater than zero within the particular distance of the spotter vehicle;

confirming the detecting of the at least one target object by notifying at least a third-party entity of the detecting and by notifying the detected at least one target object of the detecting; and requesting and receiving a detection confirmation from the detected at least one target object.

2. The non-transitory computer-readable medium of claim 1, wherein the client device is hosted on a built-in console in the spotter vehicle.

3. The non-transitory computer-readable medium of claim 1, wherein the searching further comprises operating a video camera to detect the at least one target object in the line of sight between the at least one target object and the spotter vehicle.

4. The non-transitory computer-readable medium of claim 3, wherein the at least one target object includes a target vehicle for which at least one attribute is a basis for the searching.

5. The non-transitory computer-readable medium of claim 4, wherein the at least one attribute comprises a particular make, model, or color of the target vehicle.

6. The non-transitory computer-readable medium of claim 1, wherein the third-party entity comprises a service-provider.

7. A detection method, comprising:

quantifying, by a detector device controlled by an application hosted in or on a spotter vehicle, a magnitude of an obstruction, wherein the magnitude of the obstruction approaches 0% if a line of sight is clear between a target vehicle and both an alternative spotter and the spotter vehicle;

determining, by the detector device, whether the quantified magnitude of the obstruction is permissible to detect the target vehicle, wherein the quantified magnitude of the obstruction is permissible if below a threshold magnitude of obstruction;

detecting, by the detector device and based, at least in part, on the quantified magnitude of the obstruction being below the threshold magnitude of obstruction, the target vehicle, wherein the target vehicle has at least one designated attribute, and wherein the spotter vehicle is a vehicle from which verified detection of the target vehicle is sought;

confirming, by a first object controlled by the application hosted in or on the spotter vehicle, that the detected target vehicle is within a particular distance of the spotter vehicle and moving at least at a threshold rate of speed greater than zero within the particular distance of the spotter vehicle; and confirming detection, by the first object, of the detected target vehicle by transmitting a confirmation signal to at least a third party entity to provide notification of the detecting.

8. The detection method of claim 7, wherein the detecting includes performing the detecting by a surveillance system, associated with the first object, that includes a sonar detector and a radar detector having 360° detection capabilities.

9. The detection method of claim 7, further comprising: receiving, from the third-party server, a commercial reward.

10. The detection method of claim 7, further comprising: receiving, from the detected target vehicle, a signal confirming detection thereof by the first object.

11. A vehicle detection system, comprising:

a detector configured to:

search for a target vehicle that matches a particular criterion, by use of a speed and presence detection system having 360° detection capabilities;

quantify a magnitude of an obstruction, wherein the magnitude of the obstruction approaches 0% if a line of sight is clear between the target vehicle and the detector;

determine whether the quantified magnitude of the obstruction is permissible to detect the target vehicle, wherein the quantified magnitude of the obstruction is permissible if below a threshold magnitude of obstruction; and based, at least in part, on the quantified magnitude of the obstruction being below the threshold magnitude of obstruction, the target vehicle within a particular distance of the spotter vehicle and moving at least a threshold rate of speed greater than zero within the particular distance of the spotter vehicle, indicate that the target vehicle that matches the particular criterion has been detected in relation to a host of the vehicle detection system, the host of the vehicle detection system being a vehicle from which verified detection of the target vehicle is sought; and a confirmation module operatively coupled to the detector and configured to confirm that the target vehicle that matches the particular criterion has been detected in relation to the host of the vehicle detection system, by receipt of confirmation from the target vehicle.

12. The vehicle detection system of claim 11, wherein the detector includes a camera mounted on or located in the host of the vehicle detection system.

13. The vehicle detection system of claim 11, wherein the detector includes a laser mounted on or located in the host of the vehicle detection system.

14. The vehicle detection system of claim 11, wherein to confirm that the target vehicle that matches the particular criterion has been detected, the confirmation module is configured to request confirmation from the target vehicle.

* * * * *

UNITED STATES PATENT AND TRADEMARK OFFICE
CERTIFICATE OF CORRECTION

PATENT NO.       : 9,810,783 B2
APPLICATION NO.  : 14/278802
DATED            : November 7, 2017
INVENTOR(S)      : Fligler et al.

It is certified that error appears in the above-identified patent and that said Letters Patent is hereby corrected as shown below:

In the Specification

In Column 12, Lines 16-17, delete "general such" and insert -- general, such --, therefor.

In the Claims

In Column 14, Line 32, in Claim 11, delete "least a" and insert -- least at a --, therefor.

Signed and Sealed this
Twenty-fourth Day of April, 2018

Andrei Iancu
*Director of the United States Patent and Trademark Office*